United States Patent [19]
Richmond

[11] Patent Number: 5,487,528
[45] Date of Patent: Jan. 30, 1996

[54] QUIET APPLIANCE WATER VALVE

[75] Inventor: James W. Richmond, Carmel, Ind.

[73] Assignee: Emerson Electric Co., St. Louis, Mo.

[21] Appl. No.: 51,136

[22] Filed: Apr. 22, 1993

[51] Int. Cl.$^6$ ............... F16K 47/14; F16K 31/40; F16K 31/385

[52] U.S. Cl. ............ 251/127; 251/30.03; 138/42; 138/45

[58] Field of Search ............... 251/30.03, 118, 251/120, 127; 138/42, 45

[56] References Cited

U.S. PATENT DOCUMENTS

| | | | |
|---|---|---|---|
| 1,784,673 | 12/1930 | Loepsinger et al. | 251/127 |
| 2,829,674 | 4/1958 | Segelhorst et al. | 138/45 |
| 3,011,752 | 12/1961 | Stone | 251/127 X |
| 3,396,848 | 8/1968 | Kozel | 251/120 X |
| 3,431,944 | 3/1969 | Sakuma | 138/45 |
| 3,446,246 | 5/1969 | Huley | 137/625.5 |
| 4,248,270 | 2/1981 | Ostrowski | 251/120 X |
| 5,082,240 | 1/1992 | Richmond | 251/120 |
| 5,209,265 | 5/1993 | Taguri et al. | 138/42 X |
| 5,269,333 | 12/1993 | Richmond | 137/1 |

OTHER PUBLICATIONS

N. Mirizzi et al., Predictions of Noise Aerodynamically Generated by Control Valves, ISA Transactions, vol. 16, No. 6, pp. 19–20 (1977).

William Blake, Mechanics of Flow–Induced Sound & Vibration, Applied Mathematics and Mechanics, vol. 17, pp. 712–717 (1986).

*Primary Examiner*—John Rivell
*Attorney, Agent, or Firm*—Eric R. Waldkoetter

[57] ABSTRACT

A solenoid controlled, pilot actuated inlet water valve apparatus has an inlet connected to a residential water source pipe and an outlet connected to an appliance such as a dishwasher or clothes washing machine. The inlet water valve contains a flow control, a noise suppressor, a pilot valve controlled by an electrically operated armature, and a main valve composed of a diaphragm, diaphragm insert, valving surface and bleed passage. The noise suppressor is located downstream of the flow control and reduces water velocity by first radially dispersing incoming water to the periphery of the noise suppressor in a dispersion chamber. Next, water passes through passage holes located around the periphery of the noise suppressor into a recombining chamber with it is directed toward a central exit port. When water moves in the recombining chamber toward the central exit port, the water converges from different directions further reducing water velocity and noise caused by cavitation.

10 Claims, 5 Drawing Sheets

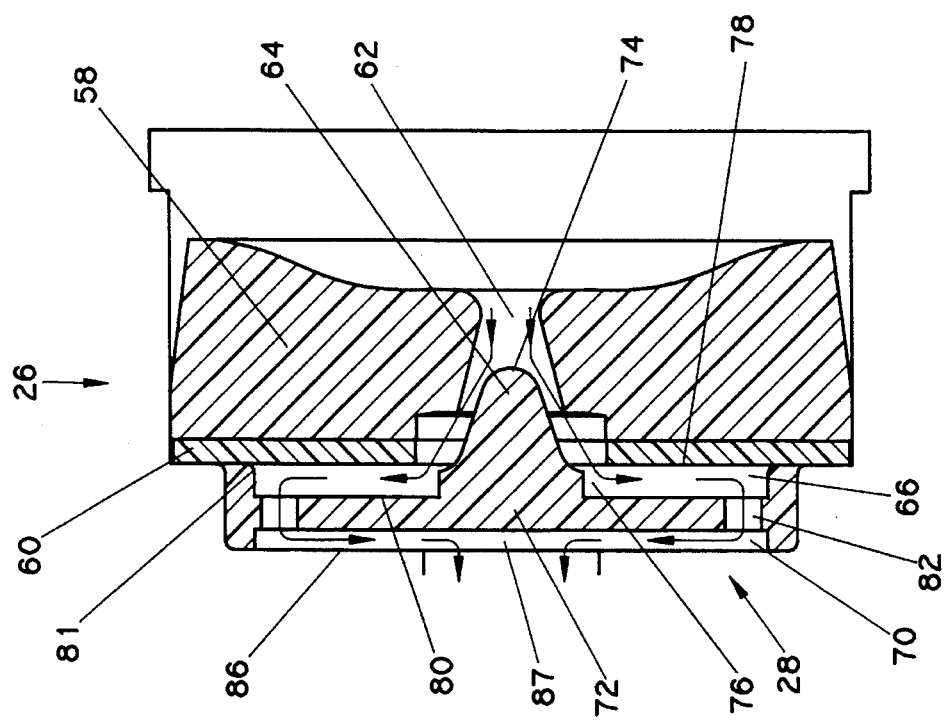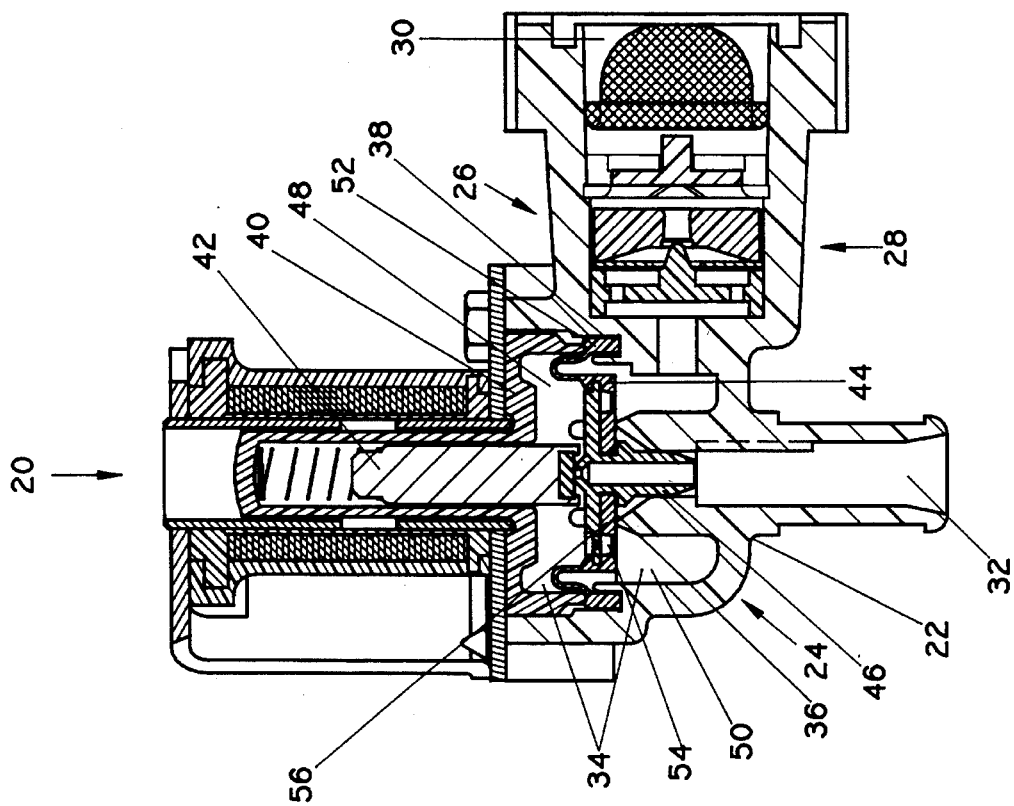

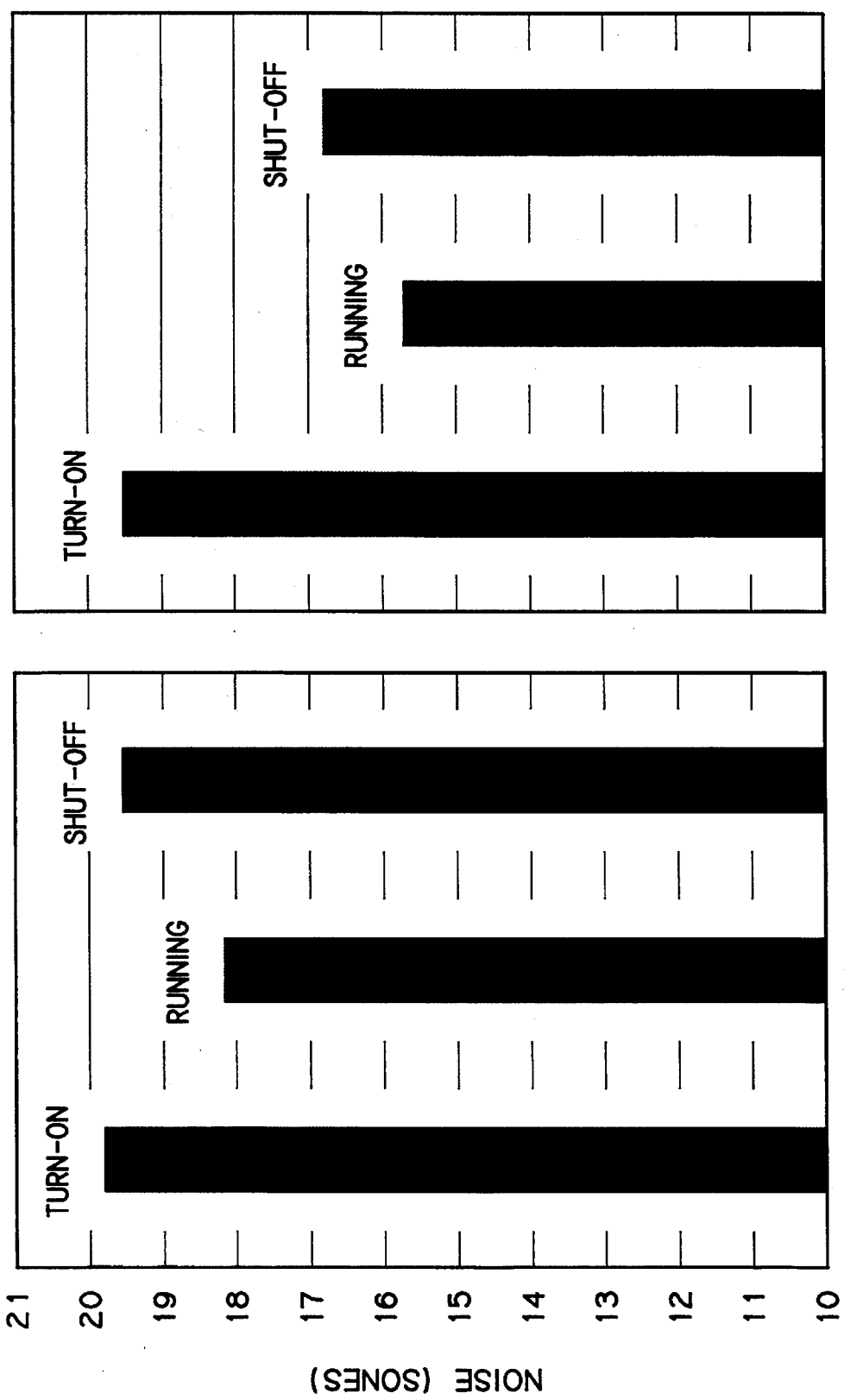

5,487,528

QUIET APPLIANCE WATER VALVE

BACKGROUND

This invention relates to solenoid controlled, pilot operated inlet water valves and more specifically to water valves used in household appliances such as dishwashers and clothes washing machines. This invention is an improvement on U.S. Pat. No. 5,082,240 issued to Richmond and which is hereby incorporation by reference.

One of the major sources of noise in appliance water valves can be cavitation which is the collapse of low-pressure bubble that occurs when water flows from a higher pressure, such as an inlet, to an area of lower pressure, such as a valving cavity of outlet. Low-pressure bubble collapse releases energy the causes structural vibration that can produce noise and erosion, fatigue and pitting in valve components. The problem of low-pressure bubble release is increased when hot water is used in a valve. Hot water is less stable and therefore creates more low-pressure bubbles under the same conditions than cold water. One way to reduce cavitation noise is to reduce water velocity prior to the water entering the lower pressure area.

Referring to FIGS. 1a–b, previous appliance water valves 20P have reduced cavitation noise by placing a solid surface 64P for water to strike soon after water passes through a flow control inlet 26P to initiate an early pressure recovery. Since the time for low-pressure bubble formation is decreased by water striking the solid surface 64P, fewer low-pressure bubbles are formed. A disadvantage of reducing cavitation noise by placing a solid surface 64P near the flow control inlet 26P is that the water flow rate may be reduced. An example of a providing a solid surface 64P for water to strike shortly after passing through a flow control inlet 64P is shown with the "noise suppression bullet" in U.S. Pat. No. 5,082,240 issued to Richmond.

Previous appliance water valves have also reduced cavitation noise by creating laminar flow scheme with baffles which cause water flow to change direction causing viscous friction to reduce water velocity. Examples of the use of a baffle to reduce water velocity can be found in U.S. Pat. Nos. 5,082,240 and 4,248,270 issued to Richmond and Ostrowski respectively.

For the foregoing reasons, there is a need to further reduce cavitation noise in appliance water valves without hindering water flow.

SUMMARY

I have invented an apparatus that satisfies the need for an appliance water valve with reduced cavitation noise. The quiet appliance water valve comprises the following. A valve body which defines an inlet, an outlet, and a valving cavity disposed between and communicating with the inlet and the outlet, and a valving surface between the inlet and the outlet. A main valve moveable to a position away from the valving surface for permitting water flow from the inlet through the valving cavity to the outlet, and moveable to a position contacting the valving surface for preventing flow from the inlet through the valving cavity. A flow control located between the inlet and the valving cavity for providing a substantially constant rate of water flow. And an apparatus for reducing water flow noise. The structure for reducing water flow noise comprises a dispersion chamber having passage holes placed downstream of a noise suppression bullet that radially disperses water to decrease inlet water velocity, and a recombining chamber downstream of the dispersion chamber which receives water from the passage holes in the dispersion chamber to redirect water flow inward toward a central exit port communicating with the valving cavity. The recombining chamber causes water flow received from the periphery of the dispersion chamber to be redirected toward a central exit port creating opposed velocity vectors that decrease water velocity upon entry into the central exit port.

BRIEF DESCRIPTION OF THE DRAWINGS

These and other features, aspects, and advantages of the present invention will become better understood with regard to the following description, appended claims, and accompanying drawings where:

FIG. 2a shows a quiet appliance water valve;

FIG. 2b shows a means for reducing water flow noise;

FIG. 4a shows a graph of average noise levels for the prior art water valve;

FIG. 4b shows a graph of average noise levels for the quiet appliance water valve;

DETAILED DESCRIPTION

Figure 1B:
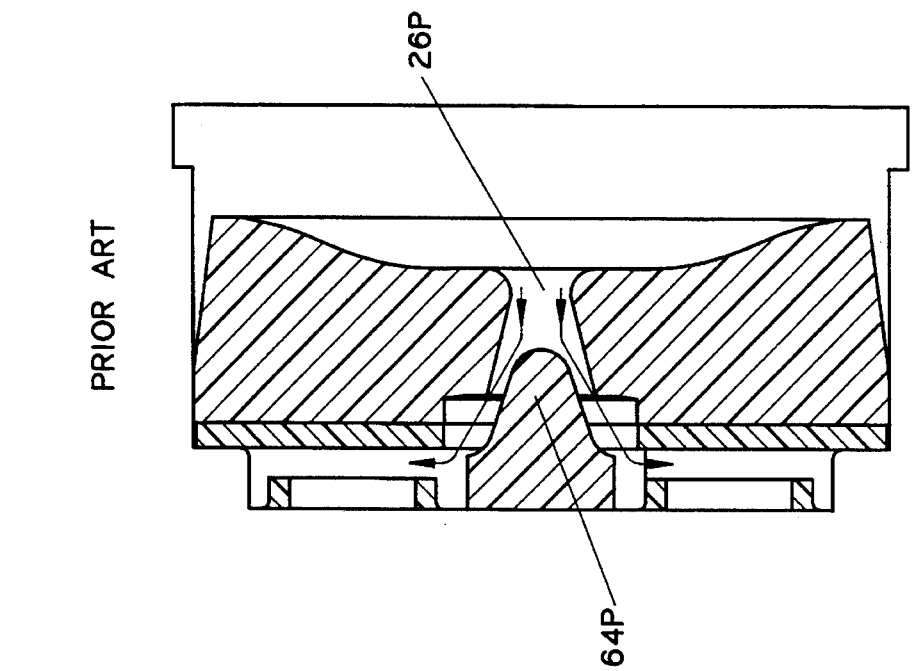
FIG. 1b shows a prior art means for reducing water flow noise.

Referring to FIGS. 2a–b, a quiet appliance water valve 20 is shown that is typically installed in a dishwasher (not shown). The quiet appliance water valve 20 comprises: a valve body 22, a main valve 24, a flow control 26, and a means for reducing water flow noise 28.

The valve body 22 is typically polypropylene and comprises an inlet 30, and outlet 32, a valving cavity 34, a valving surface 36, a diaphragm retention groove 38, and a guide tube 40 housing an armature 42. A residential water line (not shown) with service pressures ranging 20–125 pounds per square; inch (138–861.9 kPa) is connected to the inlet 30 typically with a threaded garden hose type connector or a threaded pipe connector to create flow rates through the valve 20 of about 1–20 gallons (3.79–75.71 liters) per minute. The outlet 32 is typically a tube connector to which an appliance fill tube (not shown) is clamped.

The valve body 22 includes a valving cavity 34 disposed between and communicating with the inlet 30 and outlet 32. The valving surface 36 is contained in the valving cavity 34 adjacent to the outlet 32. The valving cavity 34 also contains a retention groove 38 for fixing the main valve 24. A guide tube 40 is designed to cooperate with the retention groove 38 for fixing the main valve 24 in position.

The main valve 24 comprises a diaphragm 44 and a diaphragm insert 46. The main valve 24 divides the valving cavity 34 into an actuation chamber 48 and a main chamber 50. The main valve 24 is moveable to a position away from the valving surface 36 for permitting water flow from the inlet 30 through the valving cavity 34 to the outlet 32, and moveable to a position contacting the valving surface 36 for preventing water flow from the inlet 30 through the valving cavity 34. The diaphragm 44 is flexible and is typically made of ethylene propylene (EP) rubber and includes a retention ridge 52, a diaphragm bleed orifice 54, and a diaphragm valve seat 56. The retention ridge 52 fits in the diaphragm retention groove 38 in the valve body 22 and the guide tube 40 seats on the retention ridge 52 to fix the diaphragm 44 in the valve body 22 and to create a seal.

Referring to FIG. 2a–b, the flow control 26 is located between the inlet 30 and the valving cavity 34 for providing a substantially constant rate of water flow and comprises: a rubber flow washer 58, and an inlet washer 60. The flow control 26 cooperates with the means for reducing water flow noise 28 to vary an inlet orifice 62. The rubber flow washer 58 flexes in response to inlet water pressure. A higher inlet water pressure causes greater deformity or flexing of the rubber flow washer 58 which inturn narrows the inlet orifice 62. Lower inlet water pressures cause less flexing of the rubber flow washer 58 which inturn widens the inlet orifice 62. The inlet washer 60 is preferably stainless steel and provides a dimensionally stable surface, able to withstand residential water pressures, for the rubber flow washer 58 to flex against. The specific dimensions of the rubber flow washer 58 are generally determined by the specific application. The rubber flow washer 58 has an outer diameter of about 0.007 inches (0.018 cm) and an inner diameter of about 0.0187 inches (0.0474 cm).

Figure 3B:
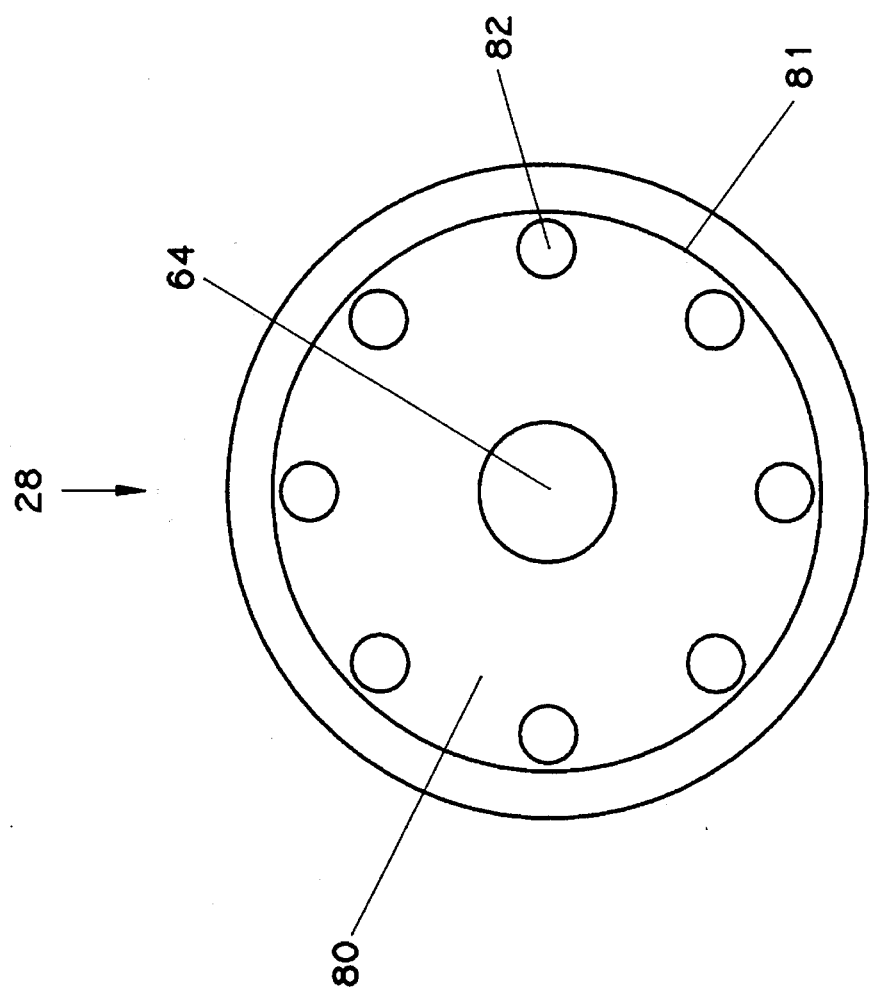
FIG. 3b shows a means for reducing water flow noise top view.
Figure 3A:
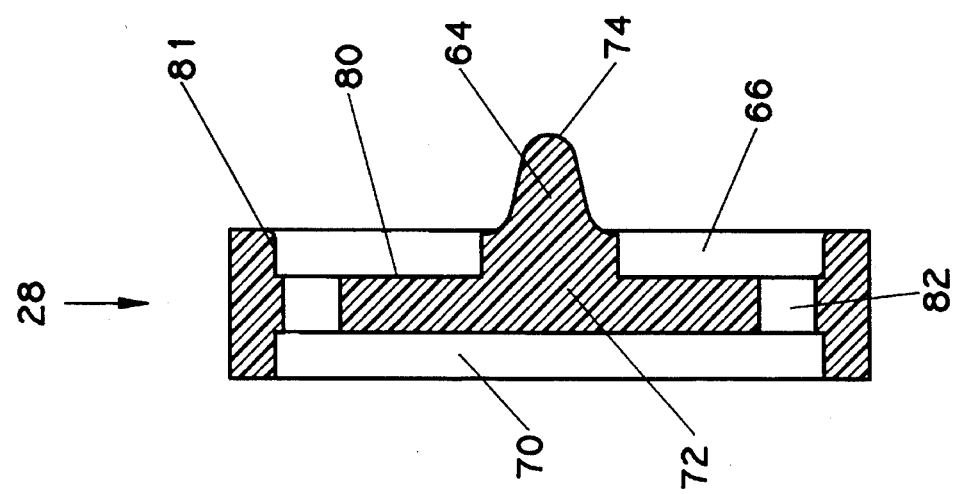
FIG. 3a shows a means for reducing water flow noise sectioned side view.
Figures 5A, 5B:
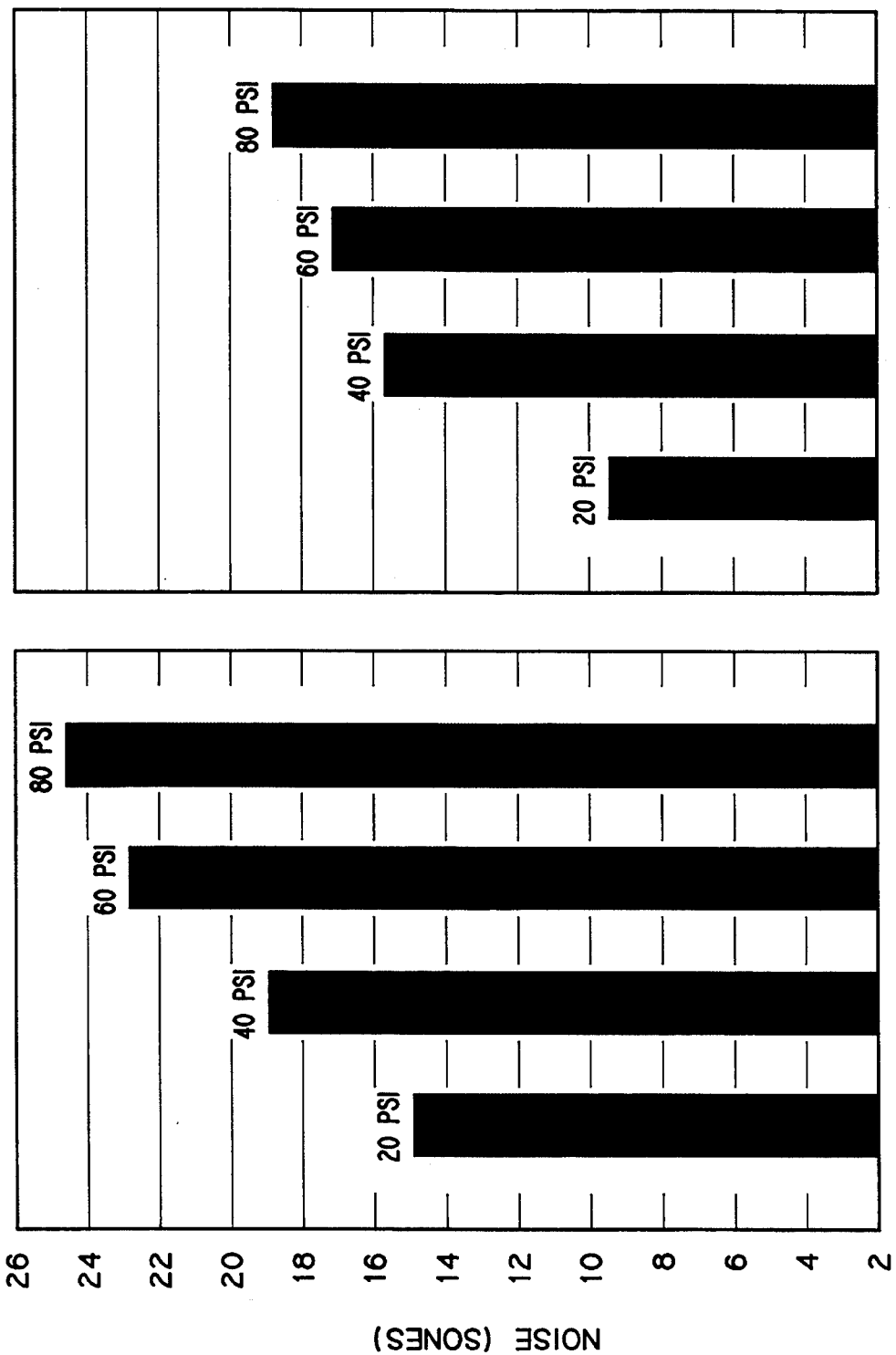
FIG. 5a shows a graph of average operating noise levels for the prior art water valve; and, FIG. 5b shows a graph of average operating noise levels for the quiet appliance water valve.

Referring to FIGS. 2b and 3a–b, the means for reducing water flow noise 28 comprises a noise suppression bullet 64, a dispersion chamber 66, passage holes 68, and a recombining chamber 70 all preferably made of polyprophlene. The means for reducing water flow noise 28 has an overall diameter of about 0.7 inches (1.78 cm). The means for reducing water flow noise 28 does so by decreasing cavitation which reduces the collapse of cavities which create noise. Cavitation is decreased by the means for reducing water flow noise 28 by reducing water velocity and creating backpressure. The means for reducing water flow noise 28 does so without substantially affecting water flow because the as backpressure is created the flow control 26 responds by increasing the inlet orifice 62 diameter to permit more water flow.

The noise suppression bullet 64 extends into the inlet orifice 62 to disperse and channel water into the dispersion chamber 66 after flowing through the flow control inlet orifice 62. The noise suppression bullet 64 provides an object directly in the path of the water flow to create backpressure for reducing water velocity. The noise suppression bullet 64 also radially distributes water into the dispersion chamber 66. The noise suppression bullet 64 sits on an integral pedestal 72 which has a diameter of about 0.149 inches (0.378 cm) and a height of about 0.045 inches (0.114 cm). The noise suppression bullet tip 74 is rounded to a radius of 0.0285 inches (0.072 cm), and the height of the noise suppression bullet 64 from tip 74 to where the noise suppression bullet 64 joins the pedestal 72 is 0.108 inches (0.274 cm). The noise suppression bullet 62 is plastic, preferably polyprophlene.

The dispersion chamber 66 comprises a dispersion inlet orifice 76, an upstream surface 78, a downstream surface 80, a peripheral wall 81 and passage holes 82. The dispersion inlet orifice 76 diameter remains nearly constant despite variations in the flow control inlet orifice 62. The upstream surface 78 is formed by the inlet washer 60. The passage holes 82 permit communication between the dispersion chamber 66 and the recombining chamber 70. The recombining chamber 70 is downstream of the dispersion chamber 66 and receives water from the passage holes 82 to redirect water flow inward toward a central exit port 84 communicating with the valving cavity 34. The diameter of both the dispersion chamber 66 and recombining chamber 70 is about 0.6 inches (1.524 cm), both the dispersion chamber 66 and recombining chamber 70 are about 0.05 inches (0.127 cm) deep.

The passage holes 82 comprise eight passage holes placed around the periphery of the dispersion chamber 66 to direct water flow into the recombining chamber 70. Each of the passage holes 82 has a diameter of about 0.062 inches (0.157 cm) and extends for about 0.06 inches (0.152 cm) through the common wall separating the dispersion chamber 66 from the recombining chamber 70. By using eight passage holes 82 rather than the four larger passage holes described in U.S. Pat. No. 5,082,240 issued to Richmond, the passage holes 82 can be placed closer to the periphery of the dispersion chamber 66 to increase the length of the water flow path.

The recombining chamber 70 comprises a downstream wall 86 and an recombining outlet orifice 87. The recombining chamber 70 is approximately the same height as the dispersion chamber 66 and directs water from the dispersion chamber 66 to the valving cavity 34. The recombining chamber downstream wall 86 is part of the valve body 22.

Operation of the quiet appliance water valve 20 follows. Referring to FIG. 2b, water flows through the rubber flow washer 58 and strikes the noise suppression bullet 64. Since the noise suppression bullet 64 is directly in the path of water flow, a backpressure is created that reduces water velocity. The noise suppression bullet 64 then radially displaces water into the dispersion chamber 66. Since the water is displaced radially into the dispersion chamber 66, the water moving into the dispersion chamber 66 sees the available volume increasing as the square of the radius of the dispersion chamber 66 and accelerates. But during the radial displacement of water, some acceleration is lost due to viscous friction created by the laminar water flow. Overall though, water moving into the dispersion chamber 66 is accelerated.

Water entering the dispersion chamber 66 moves toward the peripheral wall 81 where the water is required to make a 90 degree direction change into the passage holes 82. When the water makes the 90 degree; direction change, the peripheral wall 81 creates backpressure and the direction change causes viscous friction both of which decelerate the water. After the water changes direction, water flows through the passage holes 82. Since only a limited number of passage holes 82 exist, backpressure is once again created. Also the area of the passage holes 82 is much less than the area of the dispersion chamber 66 near the passage holes 82, so water accelerates when passing through the passage holes 82. As water exits a passage hole 82 at a higher velocity the backpressure and viscous friction generated by water flowing through the passage holes 82 is amplified which further reduces the water's velocity. As water flows against the recombining chamber downstream wall 86, water flow is impeded by backpressure that further reduces the water's velocity. After water flows against the recombining chamber downstream wall 86, the water is once again required to make a 90 degree turn which generates viscous friction and further reduces the water's velocity.

As water moves radially from the periphery of the recombining chamber 70 toward the recombining outlet orifice 87, the water again accelerates because of movement from a smaller volume to a larger volume. As the radially, inwardly accelerating water nears the recombining outlet orifice 87, the water impinges upon water flowing from other directions also toward the recombining outlet orifice 87. Water force vectors collide causing resulting vectors to be of a reduced amplitude which further decelerates the water. Additionally, the water as it converges near the recombining outlet orifice 87 creates backpressure and viscous friction that further reduces water velocity. After the water converges at the recombining outlet orifice, the only path for the water to take is another 90 degree turn toward the valving cavity 34. The water's change of direction once again creates backpressure and viscous friction which further reduces the water's velocity.

The means for reducing water flow 28 uses combinations of backpressure, viscous friction and opposing force vectors to reduce cavitation by reducing the water's velocity and increasing backpressure. Water with a propensity for outgassing, particularly hot water, is inhibited from outgassing due to the backpressure generated by the means for reducing water flow noise.

Figure 1A:
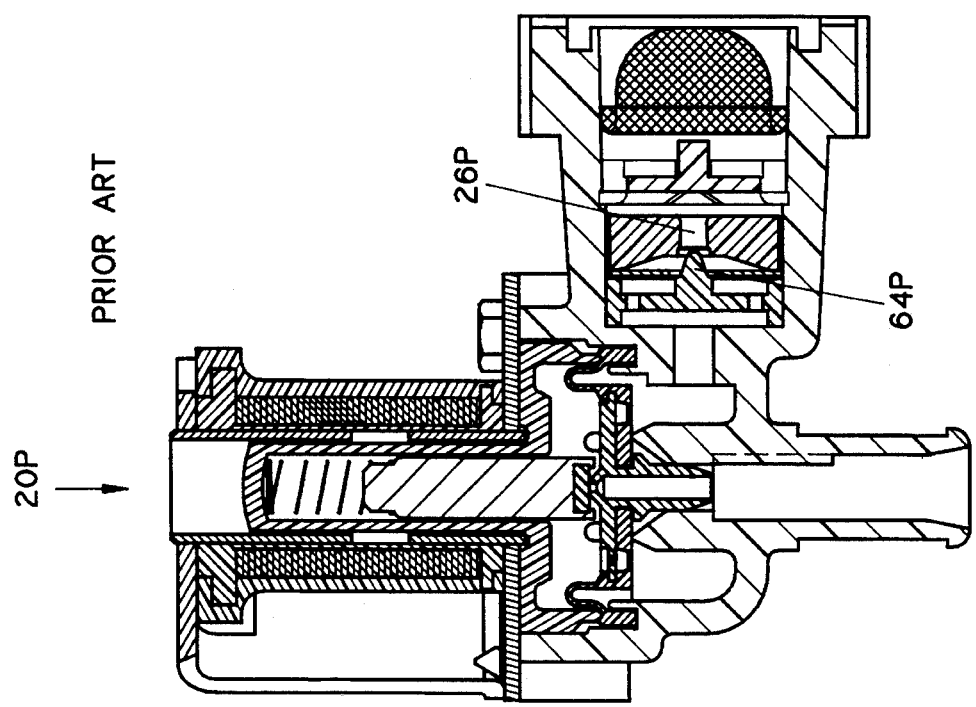
FIG. 1a shows a prior art appliance inlet water valve.

FIGS. 4a–5b show a comparison of average noise levels in a prior art water valve 20P (FIG. 1a) similar to that disclosed in U.S. Pat. No. 5,082,240 issued to Richmond and the quiet appliance water valve 20 (FIG. 2b). The quite appliance water valve 20 reduces noise levels over the prior art water valve 20P both during turn-on and turn-off and during operation over a pressure range from 20–80 pounds per square inch.

What is claimed is:

1. An appliance water valve, comprising:
   (a) a valve body defining an inlet,, an outlet, and a valving cavity disposed between and communicating with the inlet and the outlet, and a valving surface between the inlet and the outlet;
   (b) a main valve moveable to a position away from the valving surface for permitting flow from the inlet through the valving cavity to the outlet, and moveable to a position contacting the valving surface for preventing flow from the inlet through the valving cavity;
   (c) a flow control located between the inlet and the valving cavity for providing a substantially constant rate of water flow; and,
   (d) means for reducing water flow noise, comprises:
      (1) a dispersion chamber having passage holes placed downstream of the flow control which indirectly communicates with a central exit port for radially dispersing and accelerating water to the periphery of the dispersion chamber and into the passage holes decelerating water to decrease inlet water velocity,
      (2) a recombining chamber downstream of the dispersion chamber communicating with the dispersion chamber and the valving cavity receiving water from the passage holes in the dispersion chamber to redirect and accelerate all water flow radially from the periphery of the recombining chamber inward toward the central exit port thus causing water flow from opposing directions to converge at the central exit port and decelerate thereby reducing water velocity.

2. The appliance water valve as recited in claim 1, wherein the means for reducing water flow noise reduces water flow noise without substantially affecting water flow.

3. The appliance water valve as recited in claim 1 wherein the means for reducing noise is accomplished by decreasing cavitation which reduces the collapse of cavities that crease noise.

4. The appliance water valve as recited in claim 3 wherein decreasing cavitation is accomplished by reducing water velocity and creating backpressure.

5. The appliance water valve as recited in claim 1, further comprising: a noise suppression bullet extending into the flow control to disperse and channel water into the dispersion chamber after flowing through the flow control.

6. The appliance water valve as recited in claim 1 wherein the passage holes in the dispersion chamber are placed around the periphery of the dispersion chamber to increase a water flow path.

7. The appliance water valve as recited in claim 2 wherein the dispersion chamber causes water flow to change directions and reduce velocity due to viscous friction and placing an object in the path of water flow to create back pressure.

8. The appliance water valve as recited in claim 1 wherein the reuniting chamber causes water flow received from the periphery of the dispersion chamber to be redirected toward a central exit port creating opposed velocity vectors that decrease water velocity upon entry into the central exit port.

9. The appliance water valve as recited in claim 1 wherein when water is received from the passage holes in the dispersion chamber into the recombining chamber the water makes about a 90 degree turn.

10. The appliance water valve as recited in claim 1 wherein when water moves from the recombining chamber into the central exit port, the water makes about a degree turn.

* * * * *